(12) United States Patent
Bartel (10) Patent No.: US 7,740,091 B2
(45) Date of Patent: Jun. 22, 2010

(54) DRIVE WHEEL STEERING SYSTEM FOR LAWNMOWER

(75) Inventor: Harlan Bartel, Newton, KS (US)

(73) Assignee: Excel Industries, Inc., Hesston, KS (US)

( * ) Notice: Subject to any disclaimer, the term of this patent is extended or adjusted under 35 U.S.C. 154(b) by 334 days.

(21) Appl. No.: 11/837,091

(22) Filed: Aug. 10, 2007

(65) Prior Publication Data

US 2008/0035394 A1 Feb. 14, 2008

Related U.S. Application Data

(60) Provisional application No. 60/822,040, filed on Aug. 10, 2006.

(51) Int. Cl.
 *B62D 11/02* (2006.01)
(52) U.S. Cl. .............. 180/6.48; 180/19.1; 180/19.2; 180/19.3
(58) Field of Classification Search .............. 180/6.48, 180/19.1, 19.2, 19.3
See application file for complete search history.

(56) References Cited

U.S. PATENT DOCUMENTS

| | | | |
|---|---|---|---|
| 2,354,576 A | 7/1944 | Clark | |
| 2,766,834 A | 10/1956 | Boyer | |
| 2,818,699 A | 1/1958 | Clemson | |
| 3,190,672 A | 6/1965 | Swanson et al. | |
| 3,336,042 A | 8/1967 | Southall | |
| 3,465,841 A | 9/1969 | Pulskamp et al. | |
| 3,485,314 A | 12/1969 | Herr | |
| 3,891,042 A | 6/1975 | Braun | |
| 4,175,628 A | 11/1979 | Cornell et al. | |
| 4,301,881 A | 11/1981 | Griffin | |
| 4,395,865 A | 8/1983 | Davis, Jr. et al. | |
| 4,538,695 A | 9/1985 | Bradt | |
| 4,558,558 A | 12/1985 | Horner, Jr. et al. | |
| 4,715,168 A | 12/1987 | Oxley | |
| 4,790,399 A | 12/1988 | Middlesworth | |
| 4,874,055 A | 10/1989 | Beer | |
| 4,878,339 A | 11/1989 | Marier et al. | |
| 4,914,592 A | 4/1990 | Callahan et al. | |
| 4,998,948 A | 3/1991 | Osterling | |
| 5,004,251 A | 4/1991 | Velke et al. | |
| 5,131,483 A | 7/1992 | Parkes | |
| RE34,057 E | 9/1992 | Middlesworth | |
| 5,181,579 A * | 1/1993 | Gilliem | 180/6.48 |
| 5,388,850 A | 2/1995 | Simone | |
| 5,507,138 A * | 4/1996 | Wright et al. | 56/14.7 |
| 5,644,903 A * | 7/1997 | Davis, Jr. | 56/10.8 |
| 5,913,802 A * | 6/1999 | Mullet et al. | 56/10.8 |
| 7,478,689 B1 * | 1/2009 | Sugden et al. | 180/19.3 |

FOREIGN PATENT DOCUMENTS

NL 289954 6/1965

\* cited by examiner

*Primary Examiner*—Lesley Morris
*Assistant Examiner*—Michael R Stabley
(74) *Attorney, Agent, or Firm*—Robert O. Blinn (57) ABSTRACT

A drive wheel steering system for a lawnmower has a handle bar assembly that is pivotal about a vertical axis to provide directional control of the mower and rotatable about a horizontal axis to provide speed control of the mower. A control bar is operable to set a desired forward speed of the mower via engagement of a cam and the linkage assembly providing directional and speed control for the mower.

19 Claims, 9 Drawing Sheets

DRIVE WHEEL STEERING SYSTEM FOR LAWNMOWER

CROSS-REFERENCE TO RELATED APPLICATIONS

This application claims the benefit of prior U.S. Provisional application Ser. No. 60/822,040, filed Aug. 10, 2006, the disclosure of which is incorporated herein by reference.

BACKGROUND OF THE INVENTION

1. Technical Field

The present invention relates generally to vehicle steering systems. In particular, the present invention relates to an improved drive wheel steering system for a lawnmower.

2. Related Art

Two basic types of steering systems are used for tractor-type power lawnmowers. The first type of steering system is a conventional vehicle steering system wherein a first set of wheels, mounted either at the front or the rear of the mower frame, are turned in unison through a steering wheel mechanism, while a second set of wheels are driven by a traction system. The traction system is powered by an engine to allow the mower to propel itself over the ground. The drive wheels may include a differential device to prevent wheel skid during turns.

The second type of steering system, which the present invention involves, is referred to as drive wheel steering, whereby two drive wheels are on fixed axles and do not turn about a vertical axis. A set of caster wheels, often mounted at the front of the mower frame, are not driven or steered, but are able to rotate about vertical axes during operation of the mower. Turning is achieved in these systems by rotating the two drive wheels at different speeds or in different directions for a very sharp turn, or even a zero turn radius wherein the mower actually turns about the mid-point of the drive wheel axis. In drive wheel steering systems, the mower becomes much more maneuverable than conventional vehicle steering, and slow mowing speeds are conducive to this improved maneuverability.

Hydraulically powered drive wheel systems typically include a separate variable displacement hydraulic pump for each of the two drive wheels. These variable displacement pumps are typically of the axial piston type which include a tiltable swash plate that can vary the pump discharge rate from a zero flow, also referred to as neutral, up to a maximum flow in a forward direction or up to a maximum flow in a reverse direction. This variable flow rate takes the place of a transmission and a clutch. While conventional steering is easily accommodated by a steering wheel through a mechanical linkage, drive wheel steering systems, wherein flow rates to the wheel motors control the turning, are more difficult to adapt to a conventional steering wheel.

Drive wheel steering type mowers have typically been controlled by a pair of side-by-side levers which move forward and aft from a neutral position to achieve steering. A primary disadvantage of this type of steering system is that in either an acceleration or deceleration condition, the momentum of the operator and his arms on the control levers have a tendency to apply a reverse input control to the system. For example, when the operator pulls the two control levers aft in attempting to decelerate the mower, the forward momentum of the driver tends to move the levers in the reverse direction. This problem can be particularly pronounced when operating a walk-behind lawnmower, because the operator has no stationary point of reference on the mower to use for stabilization. Various stabilizing bars have been proposed for attachment at the rear of walk-behind mowers that provide the operator with a surface on which to lean. However, the use of stabilizing bars generally tend to restrict the operator's freedom of hand movement behind the mower. Moreover, these stabilizer bars are of limited utility because the bars are intended merely as rest for the operators palms, rather than providing a positive gripping surface.

Other conventional drive wheel steering mowers have been controlled by a pair of side-by-side levers that each include a "pistol grip" type handle control. Using such a system, the operator controls the speed of the left and right drive wheels by manually manipulating the left and right pistol grip controls, respectively. The use of pistol grip controls, however, presents several problems. Repeatedly compressing and releasing the pistol grip controls during operation of the mower quickly proves tiresome, leaving the operator's hands sore and fatigued. Further, because the operator must keep a relatively loose grip on the levers in order to manipulate the pistol grips, mowers that incorporate pistol grip style steering systems are difficult to turn and keep steady. Moreover, it takes a significant amount of time to become comfortable and adept with the physical movements required to operate pistol grip style steering systems.

Drive wheel steering systems have also been devised that utilize a single lever for controlling both the speed and turning function of lawnmowers. However, such systems are generally complex, requiring one set of linkages to control the turning function and a second, separate set of linkages to control the speed of the mower. The turning function linkages of such systems are usually connected to the bottom of the steering column. This presents another disadvantage, particularly when used on walk-behind mowers. Connecting linkages to the bottom of the steering column requires that the steering column extend downward to a point close to the pumps. Thus, the steering column restricts the area underneath the steering lever in which the operator is permitted to move when walking behind the mower.

A need therefore exists for an improved drive wheel steering system for a lawnmower that overcomes the shortcomings found in the prior art.

BRIEF SUMMARY OF THE INVENTION

Briefly the present invention includes a steering and control system for a drive wheel steering lawnmower. The lawnmower includes a mower frame that is supported for rolling over the ground by a pair of drive wheels. The direction and speed of rotation for the drive wheels controlled by operation of a pump and motor unit associated with each drive wheel. A handle bar assembly is pivotally mounted to a control panel support that is positioned upwardly and rearwardly from the lawnmower frame support members. The handle bar assembly operable for maneuvering and directional control of the lawnmower and may be rotated about its horizontal axis to control the speed and direction of the lawnmower.

A linkage mechanism operatively connects the handle bar assembly to the pump and motor unit, such that rotating the handle bar assembly about a vertical axis changes the position of a swash plate on the associated pump and motor unit to increase the rotation of at least one drive wheel while decreasing the rotation of the other drive wheel to steer the mower frame. The linkage mechanism also operatively connects the handle bar assembly whereby rotating the handle bar assembly about a horizontal axis increases or decreases the output of the pump and motor units to rotate drive wheels and control the forward or rearward speed of the lawnmower.

The invention contemplates a control assembly that is selectively engageable with said linkage assembly to set a desired forward speed of the mower frame. Engagement of the control system rotates a cam into engagement with the linkage mechanism to set a desired forward speed of the lawnmower.

DETAILED DESCRIPTION OF THE INVENTION

Figure 1:
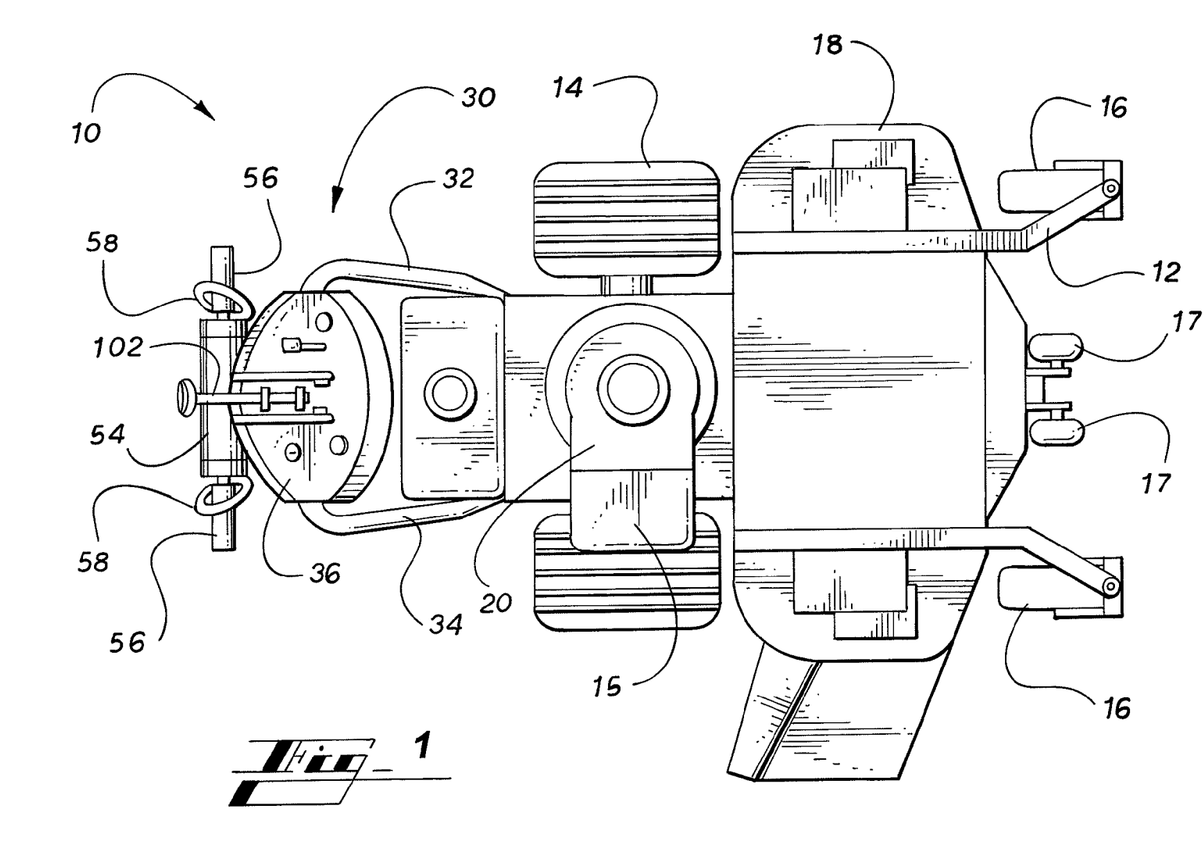
FIG. 1 is an overhead plan view of a drive wheel steering lawnmower.

Referring to FIG. 1, a lawnmower 10, as shown from above, comprises a frame 12 that is movably supported for rolling over the ground by a left drive wheel 14, a right drive wheel 15, and a pair of caster wheels 16. The caster wheels 16 are mounted at the front of the frame 12. A cutting deck 18 is suspended beneath the frame 12 between the drive wheels 14 and 15 and the caster wheels 16. One or more anti-scalp rollers 17 may be attached to the front of the cutting deck 18 for rolling on the ground to prevent scalping of the turf as the vehicle travels over uneven terrain. An engine 20 is supported by the frame 12 for powering one or more cutting blades (not shown) housed within the cutting deck 18.

Figure 2:
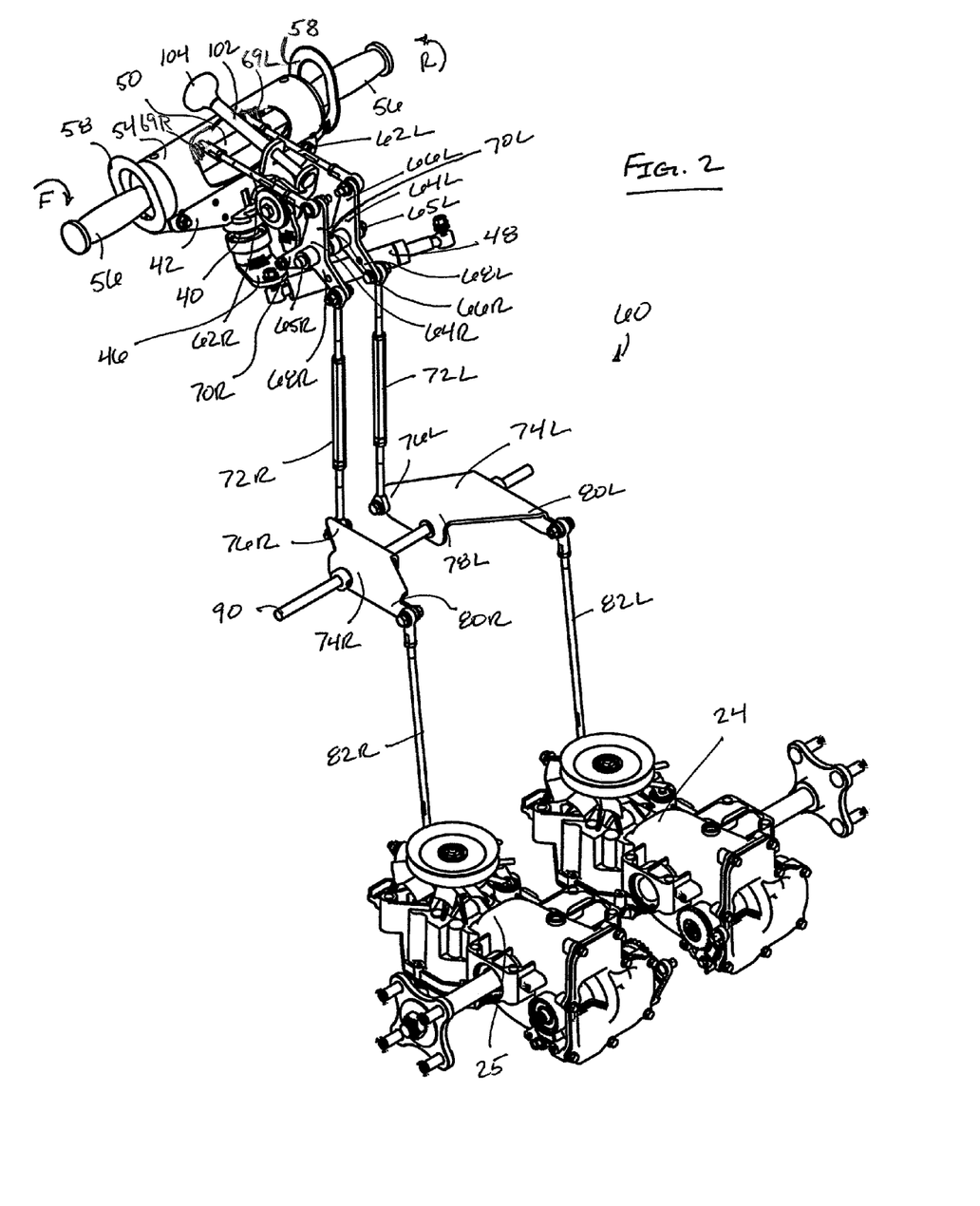
FIG. 2 is a front perspective view of a drive wheel steering system and control assembly.
Figure 7:
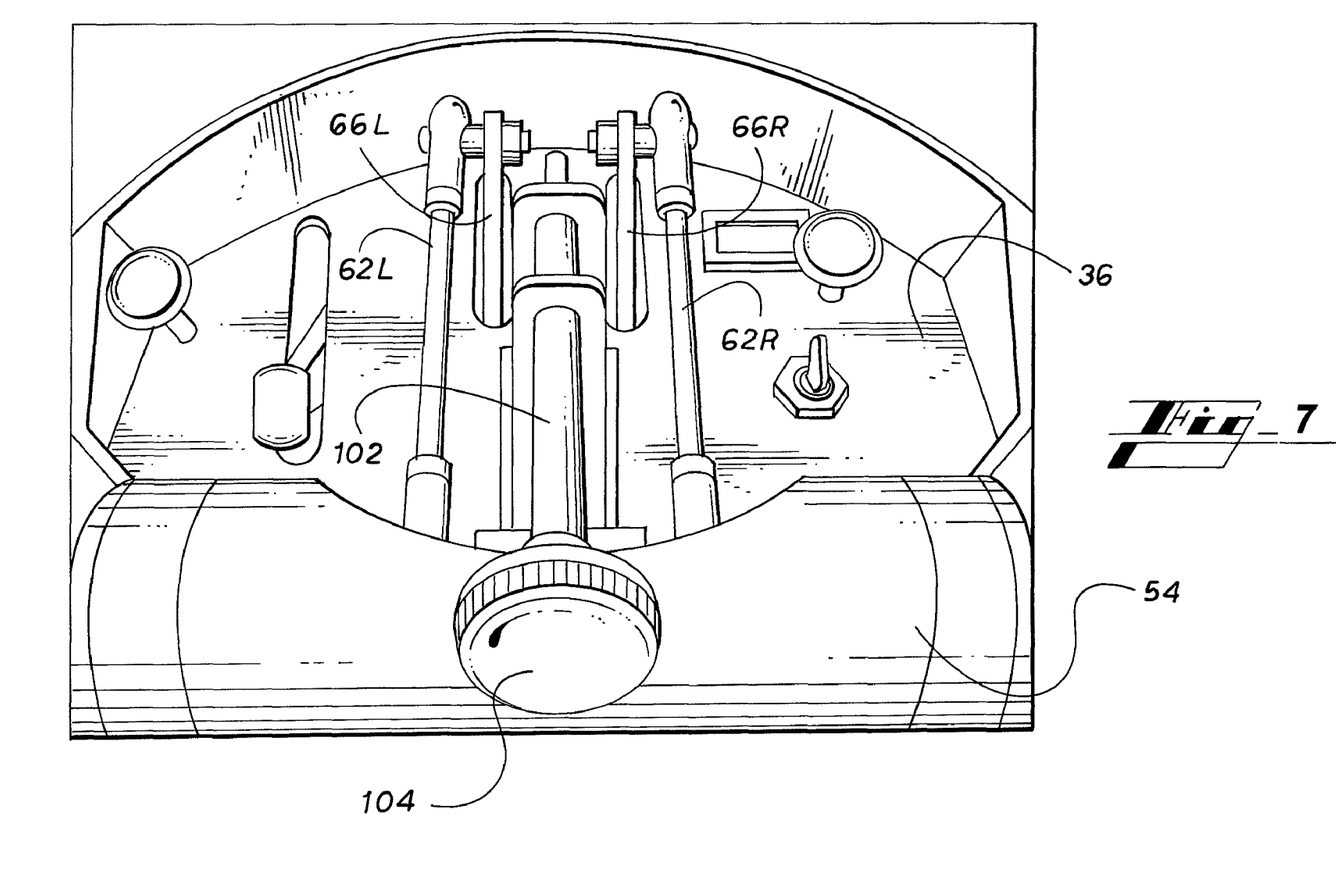
FIG. 7 is an overhead plan view of a control assembly in the neutral position.

A handle bar assembly 30 is attached to, and extends rearwardly and upwardly from, a rear portion of the frame 12 for maneuvering and controlling the operation of the mower 10. The handle bar assembly 30 includes a pair of support members 32 and 34 that are mounted to and extend from the rear portion of the frame 12 in a generally parallel, spaced-apart relation. A control panel frame 36 is attached to an upper end of each support member 32 and 34 and extends between the support members 32 and 34. The control panel 36 includes various controls and instrumentation used for operating the mower 10 (FIG. 7). Openings are provided in the control panel 36 through which a handle bar shaft 40 (FIGS. 2 and 3), a control arm 102, and a linkage mechanism 60 (FIGS. 2 and 3) pass. A handle bar cover 54 is attached to an upper end of the handle bar shaft 40 via a pair of gussets 42 (FIGS. 2 and 4). A handle bar 50 (FIG. 2) passes through the handle bar cover 54. A handle bar grip 56 is attached at each end of the handle bar 50. An operator presence switch 58 is provided at an inner end of each handle bar grip 56.

Figure 3:
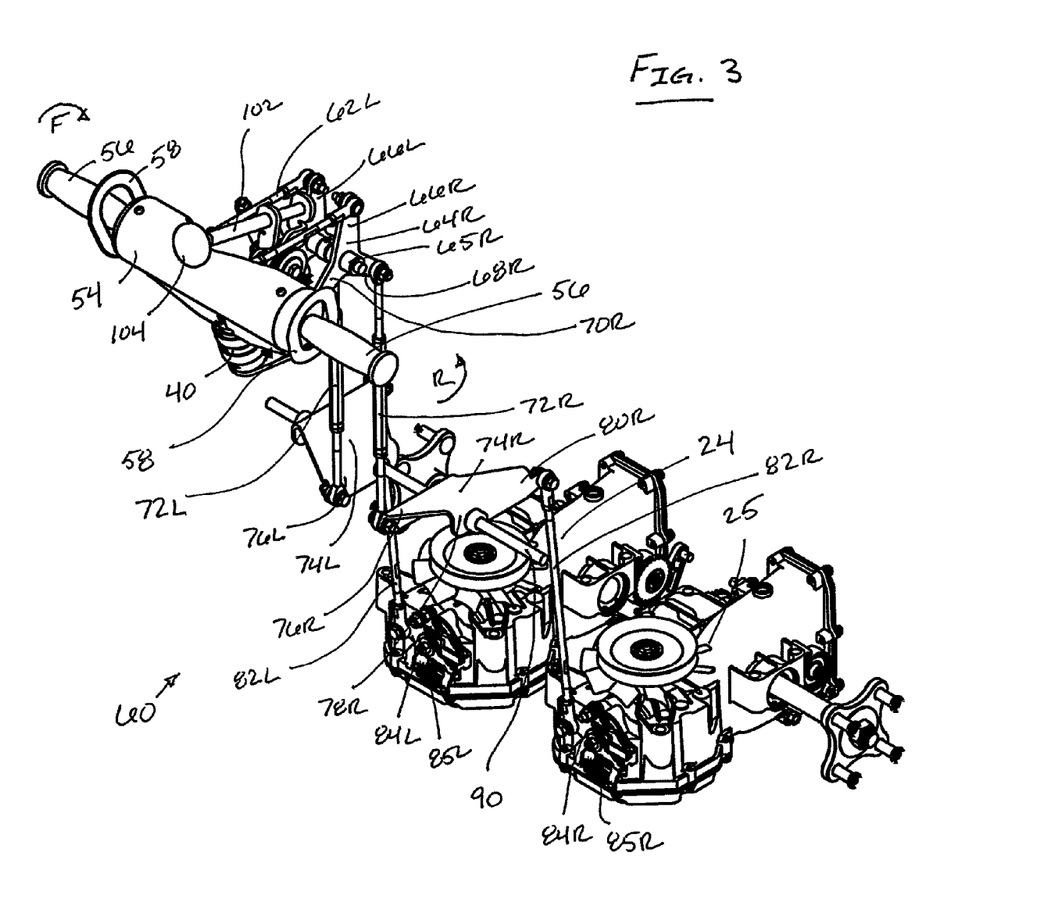
FIG. 3 is a rear perspective view of a drive wheel steering system and control assembly.
Figure 4:
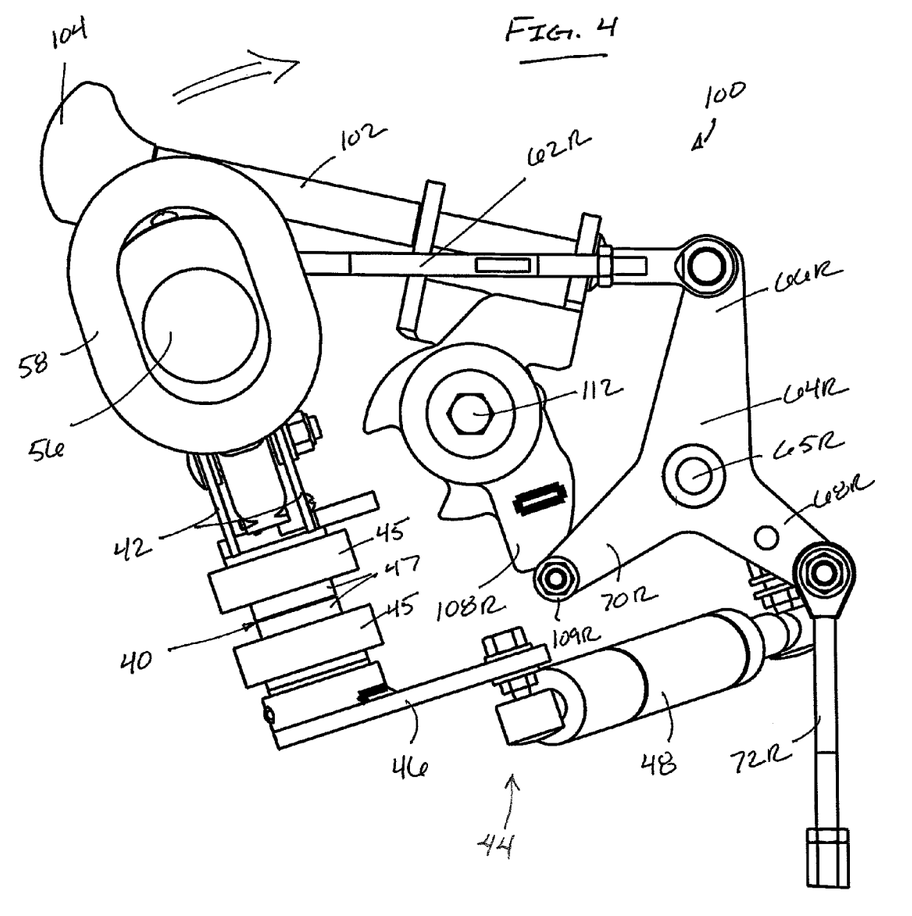
FIG. 4 is a side elevation view of a control assembly in the neutral position.

With reference to FIGS. 2 and 3, a left integrated pump and motor unit 24 and a right integrated pump and motor unit 25 are positioned generally below and on either side of the engine 20. Each pump and motor unit 24 and 25 includes a variable flow, positive displacement pump and a hydraulic, low speed, high torque motor for driving the drive wheels 14 and 15, respectively. It will be appreciated that, rather than using integrated pump and motor units 24 and 25, any suitable independent, non-integrated pumps and motors may be used to drive the drive wheels 14 and 15.

As explained in further detail below, the linkage mechanism 60 associates the handle bar 50 to the pump and motor units 24 and 25 such that (1) rotating the handle bar 50 about a vertical axis increases the flow rate to one of the pump and motor units 24 or 25 while decreasing the flow rate to the other pump and motor unit 24 or 25 to steer the mower 10 and (2) rotating the handle bar 50 about a horizontal axis increases or decreases the flow rate to both pump and motor units 24 and 25 to control the forward or rearward speed of the mower 10.

The linkage mechanism 60 includes a left connecting rod 62L connected to the handle bar 50 at a lug 69L generally on a left side of the handle bar 50. The left connecting rod 62L extends generally horizontally from the lug 69L to a left upper crank 64L. The left upper crank 64L is rotatable about a bearing 65L and includes a first arm 66L, a second arm 68L, and a third arm 70L. The left connecting rod 62L is connected to the first arm 66L of the left upper crank 64L. The second arm 68L of the left upper crank 64L is connected to a left linking bar 72L that extends generally vertically downward from the left upper crank 64L to a left lower crank 74L. The left lower crank 74L extends generally horizontally and has a rear portion 76L, a middle portion 78L, and a front portion 80L. The left linking bar 72L is connected to the rear portion 76L of the left lower crank 74L. A pivot rod 90 extends generally horizontally through the middle portion 78L of the left lower crank 74L and is mounted to the rear portion of the mower frame 12. The front portion 80L of the left lower crank 74L is connected to a left pump rod 82L that extends generally vertically downward from the left lower crank 74L to a left swash plate 84L (FIG. 3) of the left pump and motor unit 24.

The linkage mechanism 60 also includes a right connecting rod 62R connected to the handle bar 50 at a lug 69R generally on a right side of the handle bar 50. The right connecting rod 62R extends generally horizontally from the handle bar lug 69R to a right upper crank 64R. The right upper crank 64R is rotatable about a bearing 65R and includes a first arm 66R, a second arm 68R, and a third arm 70R. The right connecting rod 62R is connected to the first arm 66R of the right upper crank 64R. The second arm 68R of the right upper crank 64R is connected to a right linking bar 72R that extends generally vertically downward from the right upper crank 64R to a right lower crank 74R. The right lower crank 74R extends generally horizontally and has a rear portion 76R, a middle portion 78R, and a front portion 80R. The right linking bar 72R is connected to the rear portion 76R of the right lower crank 74R. The pivot rod 90 extends generally horizontally through the middle portion 78R of the right lower crank 74R. The front portion 80R of the right lower crank 74R is connected to a right pump rod 82R that extends generally vertically downward from the right lower crank 74R to a right swash plate 84R (FIG. 3) of the right pump and motor unit 25.

The linkage mechanism 60 thus connects the swash plates 84L and 84R of the pump and motor units 24 and 25 to the handle bar 50 whereby twisting the handle bar 50 about a horizontal axis in a forward direction (as indicated by the arrows F in FIGS. 2 and 3) causes the connecting rods 62L and 62R to move forward, the upper cranks 64L and 64R to rotate about bearings 65L and 65R in a clockwise direction (as viewed from the right side), the linking bars 72L and 72R to move downward, the lower cranks 74L and 74R to rotate about the pivot rod 90 in a counterclockwise direction (as viewed from the right side), and the pump rods 82L and 82R to move upward, causing both pump and motor units 24 and 25 to stroke forward. Because both pump and motor units 24 and 25 are being stroked the same angular movement, the flow rate to both drive wheels 14 and 15 is equal, causing the mower to move forward in a straight line. The forward speed the mower attains is based on how far the handle bar 50 is twisted forward from its neutral position.

To stop the mower 10, the handle bar 50 is twisted about a horizontal axis in a reverse direction (as indicated by arrows R in FIGS. 2 and 3) to reverse the movements of the linkage mechanism 60 described above and decrease the flow rate to the drive wheels 14 and 15 until reaching the neutral position.

To move the mower 10 in a reverse direction, the handle bar is rotated about a horizontal axis in the reverse direction (as indicated by arrows R in FIGS. 2 and 3) which causes the connecting rods 62L and 62R to move rearward, the upper cranks 64L and 64R to rotate about bearings 65L and 65R in a counterclockwise direction (as viewed from the right side), the linking bars 72L and 72R to move upward, the lower cranks 74L and 74R to rotate about the pivot rod 90 in a clockwise direction (as viewed from the right side), and the pump rods 82L and 82R to move downward, causing both pump and motor units 24 and 25 to stroke in reverse. In one embodiment, the reverse flow condition of each pump and motor unit 24 and 25 is biased by a spring 85L and 85R (FIG. 3) to cause the pump and motor unit 24 and 25 to return to neutral when the operator's hands are removed from the handle bar 50.

To turn the mower to the left, the handle bar 50 is rotated about a generally vertical axis about the handle bar shaft 40 in a counterclockwise direction (as viewed from above). As a result, the flow rate to the left drive wheel 24 is decreased and the flow rate to the right drive wheel 25 is increased, thereby causing the mower 10 to turn to the left. To move the mower to the right, the handle bar 50 is rotated clockwise (as viewed from above) which functions in the reverse manner as the left turn described above.

Figure 10:
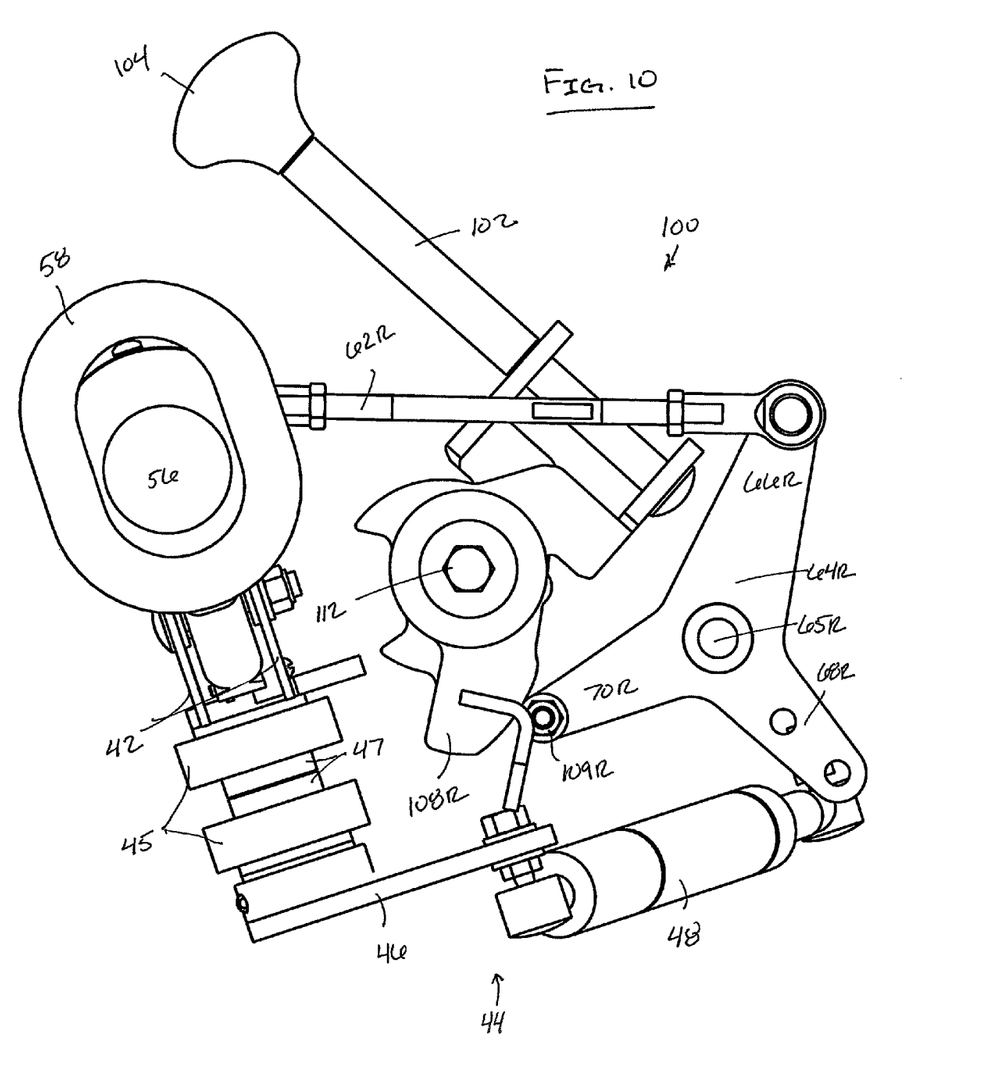
FIG. 10 is a side elevation view of a control assembly in an engaged position.

In one embodiment, the orientation of the handle bar 50 is biased by a damper assembly 44 mounted to the handle bar shaft 40 to return to straight when the operator's hands are removed from the handle bar 50. As best seen in FIGS. 4 and 10, the handle bar shaft 40 is rotatably journaled within bearings 45 that are separated by spacers 47. The damper assembly 44 includes a damper arm 46 attached to a bottom end of the handle bar shaft 40 and a self-centering damper 48 connecting the damper arm 46 to the control panel frame 36 of the handle bar assembly 30. In accordance with the described embodiment, when the handle bar 50 is turned to the left, the damper 48 is compressed by the damper arm 46. When the handle bar 50 is released by the operator, the damper 48 returns to a neutral state and brings the handle bar 50, under controlled movement, back to straight. Similarly, when the handle bar 50 is turned to the right, the damper 48 is extended by the damper arm 46. Releasing the handle bar 50 returns the damper 48 to a neutral state and brings the handle bar 50, under controlled movement, back to straight.

If the handle bar 50 is rotated about a vertical axis when in its neutral, stopped position, one pump and motor unit 24 or 25 will be stroked forward and the other pump and motor unit 24 or 25 will be stroked in reverse, causing the drive wheels 14 and 15 to turn at the same rate in opposite directions. This is referred to as a zero radius turn and the mower 10 will rotate about a vertical axis at the center point on the wheel axis.

Figure 5:
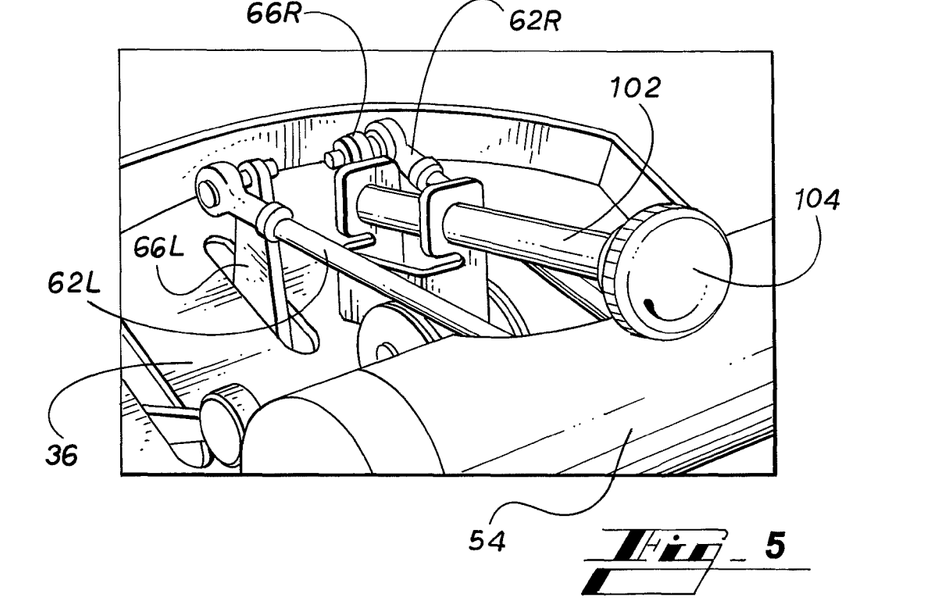
FIG. 5 is a rear perspective view of a control assembly in the neutral position.

With reference to FIG. 4, in one embodiment a control assembly 100 is provided to maintain the steering bar 50 in a neutral position. The control assembly 100 includes a control bar 102, wherein the control bar 102 has a knob 104. The control bar 102 is attached to a left control cam (not shown) and a right control cam 108 that are rotatable about a pivot 112. As shown in FIGS. 2-5 and 7, but as best seen in FIGS. 4 and 5, the control assembly 100 is in a neutral position wherein the control bar 102 is down and a bottom surface of the left control cam (not shown) is in contact with a bearing (not shown) extending inward from the third arm 70L of the left upper crank 64L. Similarly, a bottom surface of the right control cam 108 is in contact with a bearing 109R extending inward from the third arm 70R of the right upper crank 64R. Consequently, in the neutral position the upper cranks 64L and 64R are restricted from rotating in a clockwise direction (as viewed from the right side) and the drive wheels 14 and 15 are restricted from being stroked forward. Because, as previously described, the pump and motor units 24 and 25 are spring biased to neutral from a reverse flow condition, the handle bar 50 is maintained in a neutral position. It will be appreciated that, rather than using right and left control cams, a single, relatively wide cam may be used to contact the bearings on the upper cranks 64L and 64R and prevent a forward stroke.

Figure 6:
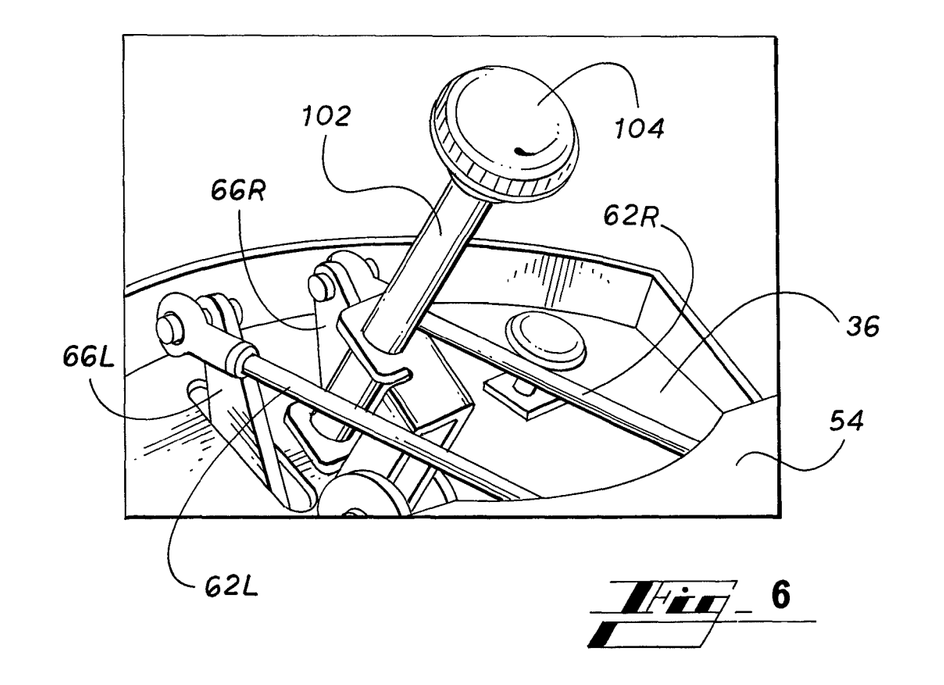
FIG. 6 is a rear perspective view of a control assembly in an engaged position.

To unlock the control assembly 100, the control bar 102 is moved generally forward and upward to an engaged (up) position (FIGS. 6 and 10). As the control bar 102 is moved toward its up position, the control cam 108 rotates about pivot 112 in a clockwise direction (as viewed from the right side). This continuously increases the space in which the upper cranks 64L and 64R may rotate to increase the flow rate to the drive wheels 14 and 15. Thus, by adjusting the control bar 102 between the down and up positions, the maximum forward speed of the mower 10 is controlled. The pivot 112 may include an adjustable washer to adjust the tension applied to the rotation of the control bar 102.

In one embodiment of the present invention, the control assembly 100 also provides cruise control functionality to the mower 10. In accordance with this embodiment, a spring (not shown) is provided between and connected to the pump and motor units 24 and 25 to bias the pump and motor units 24 and 25 to a positive flow condition. The spring thus acts to pull the linkage mechanism 60 toward a forward position and rotate the upper cranks 64L and 64R in a clockwise direction (when viewed from the right side). The left and right 109R bearings at the third arms 70L and 70R of the upper cranks 64L and 64R are therefore biased toward the left and right 108R control cams. Consequently, the speed of the mower 10 may be set to a cruising speed based on the maximum forward speed provided by the adjustment of the control bar 102.

In certain other embodiments, one or more components of the linkage mechanism 60 may be adjustable to correct various problems that tend to occur after extensive use. For instance, the length of each of the connecting rods 62L and 62R may be adjustable to correct the mower 10 from tracking to the right or to the left. Further, each linking bar 72L and 72R may comprise a turnbuckle assembly whose length may be adjusted to correct one or more of the drive wheels 14 and/or 15 from rotating when the handle bar 50 is in the neutral position.

In another embodiment, an upper portion of the linkage mechanism 60 may be interchanged with a second upper linkage mechanism by detaching the linking bars 72L and 72R from the rear portions 76L and 76R of the lower cranks 74L and 74R and attaching the second upper linkage mechanism to a lower portion of the first linkage mechanism 60 at the lower cranks 74L and 74R. For example, the upper portion of the linkage mechanism 60, which includes a handle bar 50 style steering system, may be easily detached and replaced with a pistol grip style steering system or other desired steering system.

It will be appreciated that, in addition to permitting easy interchangeability of steering systems, the use of the lower cranks 74L and 74R provides substantial clearance underneath the handle bar 50. Thus, the operator may freely walk behind the mower 10 without fear of running into a steering column or other obstruction. In other embodiments, wherein interchangeability is not desired, the linkage mechanism 60 may not include lower cranks 74L and 74R. For instance, individual linkage members may be provided that are connected to and extend from the upper cranks 64L and 64R to the swash plates 84L and 84R at the pump and motor units 24 and 25. To provide the correct flow orientation without using the direction-changing lower cranks 74L and 74R, the individual linkage members may be attached to the third arms 70L and 70R of the upper cranks 64L and 64R, or to the other side of the swash plates 84L and 84R at the pump and motor units 24 and 25. Further, to provide adequate clearance underneath the handle bar 50 in such embodiments, the length of the connecting rods 62L and 62R and the control rod 102 may be increased such that the individual linkage members extend generally vertically downward to the pump and motor units 24 and 25.

It will also be appreciated that, although the present invention has been described with reference to a walk-behind mower utilizing a hydrostatic drive system, the present invention may also be incorporated into riding mowers and mowers having a stand-on sulky device and into mowers having other drive systems, such as mechanical brake and clutch assemblies.

Figure 8:
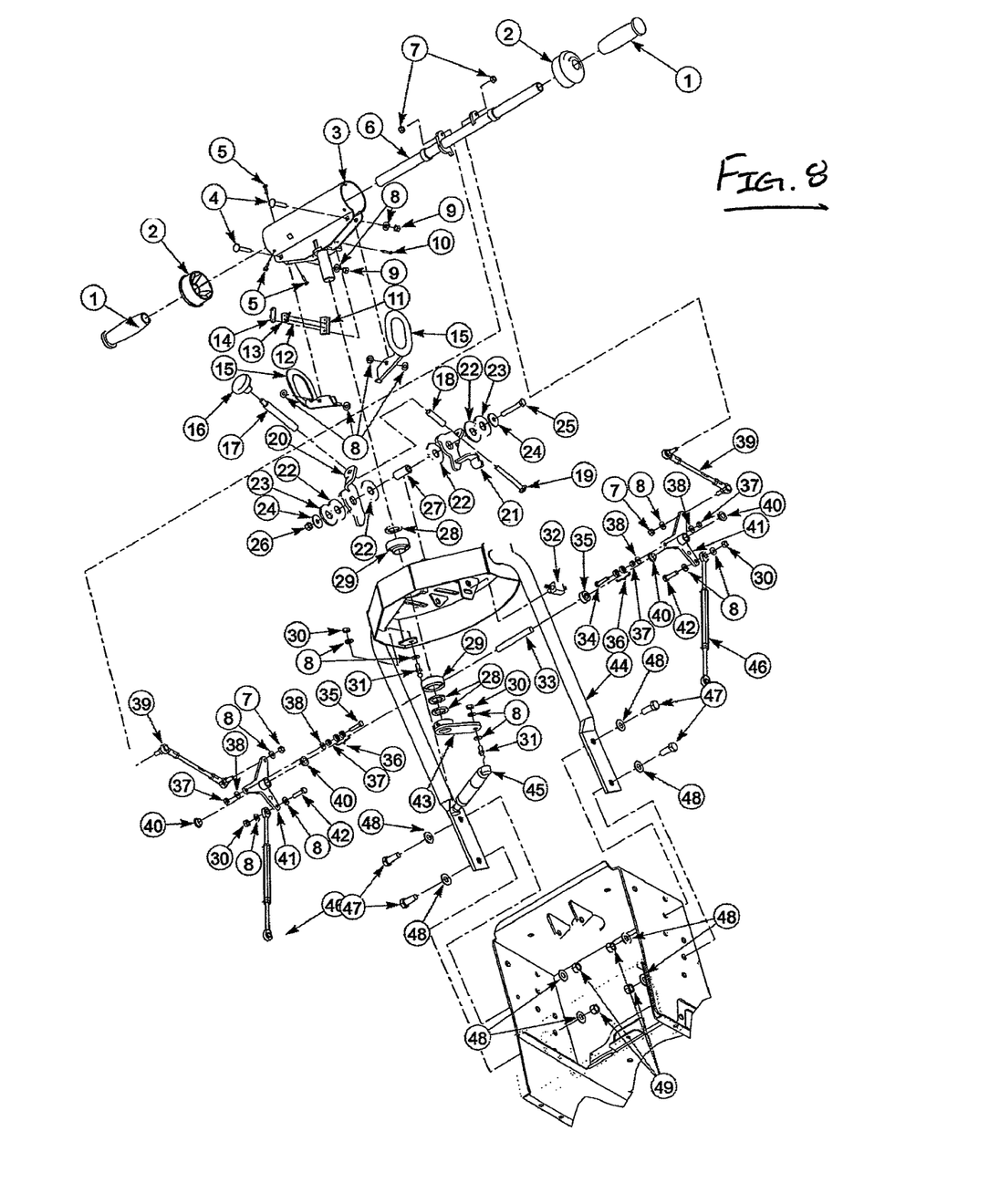
FIG. 8 is an exploded view of the linkage mechanism for the drive wheel steering system and control assembly.
Figure 9:
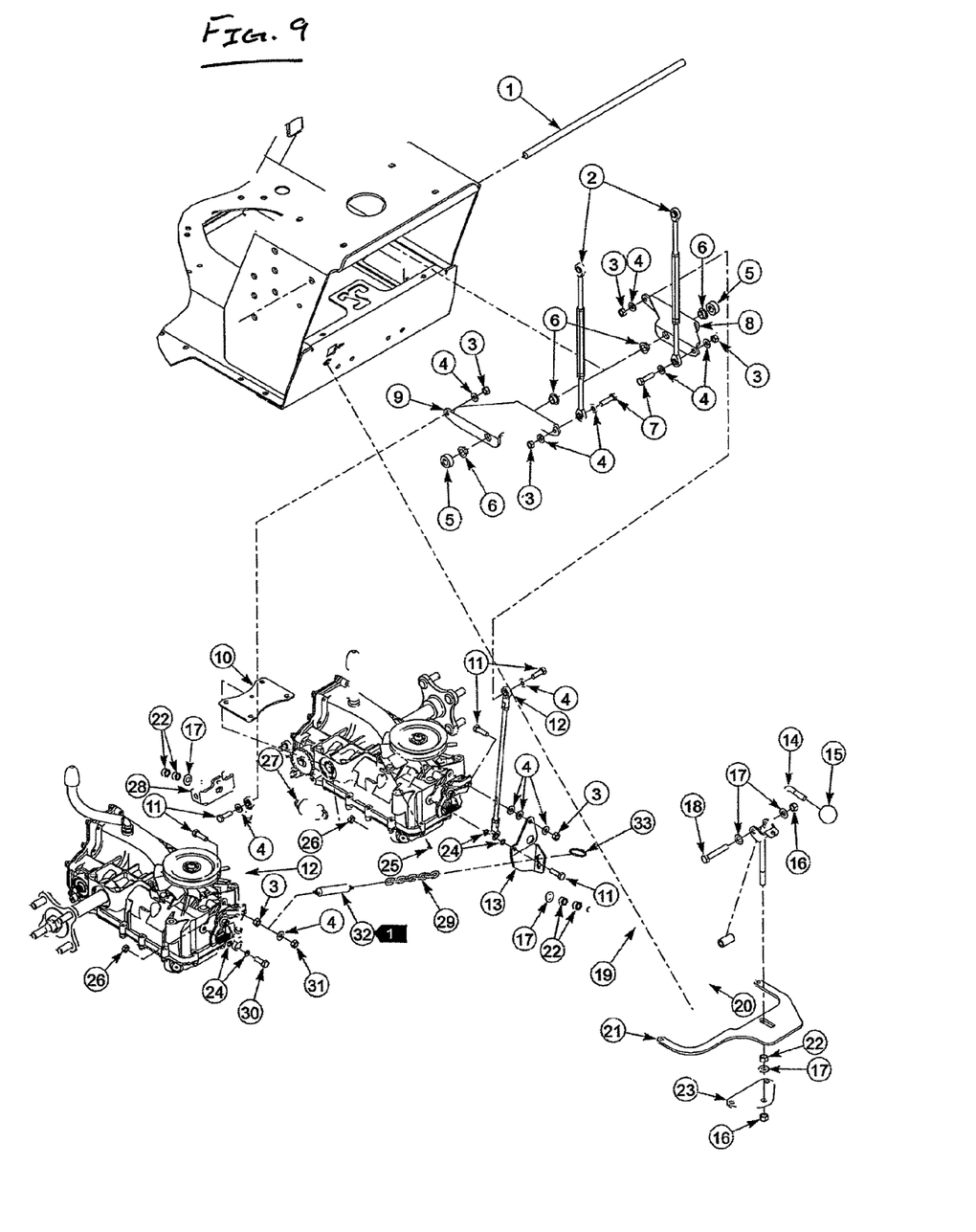
FIG. 9 is an exploded view of the linkage mechanism for the drive wheel steering system.

With reference to FIGS. 8 and 9, an exploded perspective view of the linkage mechanism 60 of the present invention is shown. A parts list for each of FIGS. 8 and 9 is included in Tables 1 and 2, respectively.

While this invention has been described with reference to preferred embodiments thereof, it is to be understood that variations and modifications can be affected within the spirit and scope of the invention as described herein and as described in the appended claims.

TABLE 1

| INDEX NO. | QTY. | DESCRIPTION |
|---|---|---|
| 1 | 2 | GRIP |
| 2 | 2 | STEERING BEARING |
| 3 | 1 | STEERING COVER |
| 4 | 2 | CB .312-18 × 1.750 SHTNK |
| 5 | 6 | SC #10 × .75 PHILLIPS |
| 6 | 1 | STEERING BAR |
| 7 | 4 | NT .312-24 HX ZNYC |
| 8 | 16 | FW .343 × .687 × .051/.080 HD |
| 9 | 2 | NT .312-18 HX ZNYC NL |
| 10 | 4 | MS #6-32 × 1.00 RD SL |
| 11 | 2 | SWITCH SPACER |
| 12 | 4 | RP .078 × .50 LONG ZN |
| 13 | 2 | OPERATOR PRESENCE SWITCH WIRE HARNESS |
| 14 | 2 | WN #6-32 × 1.00 TP 1116 |
| 15 | 2 | OPC ARM |
| 16 | 1 | 2" DIA × .375 THD KNOB |
| 17 | 1 | CRUISE HANDLE STEM |
| 18 | 1 | .500 × .049 W × 2.00 LG SPACER |
| 19 | 1 | CB .375-16 × 3.50 FUL ZN |
| 20 | 1 | UPPER CRUISE CRANK |
| 21 | 1 | LOWER CRUISECAM |
| 22 | 4 | .765 ID BEARING DISC |
| 23 | 2 | FW .810 × 2.000 × .156 SAE |
| 24 | 2 | CW .380 × 1.240 × .072 × .096 |

TABLE 1-continued

| INDEX NO. | QTY. | DESCRIPTION |
|---|---|---|
| 25 | 1 | CS .375-16 × 2.50 HX GR5 |
| 26 | 1 | NT .375-16 HXZY NL |
| 27 | 1 | .750 × .187 W × 1.62 LONG SPACER |
| 28 | 3 | FW 1.030 × 1.500 × .134 ZN |
| 29 | 2 | BEARING |
| 30 | 4 | NT .312-18 HX G5 ZNYC |
| 31 | 2 | DAMPER BALL STUD |
| 32 | 1 | PLUNGER SNAP MOUNT SWITCH |
| 33 | 1 | PIVOT PIN |
| 34 | 1 | .500 × 1.00 LOCK COLLAR |
| 35 | 2 | CS .250-20 × 1.25 HX G5 |
| 36 | 4 | .250 × .625 × .196 T BEARING |
| 37 | 4 | NT 250-20 HX GR.5 ZNYC |
| 38 | 4 | FW .281 × .625 × .051/.080 HD |
| 39 | 2 | STEERING ROD ADJUSTER |
| 40 | 4 | IGUS #MFI-0810-05 BUSHING |
| 41 | 2 | CRUISE/SPEED ARM |
| 42 | 2 | CS .312-18 × 1.25 HX G5 |
| 43 | 1 | DAMPER ARM |
| 44 | 1 | HBAR STEERING FRAME |
| 45 | 1 | CENTERING DAMPER |
| 45 | 2 | TURNBUCKLE ASSEMBLY |
| 47 | 4 | CS .500-13 × 1.25 HX G5 Z |
| 48 | 8 | FW .531 × 1.063 × .090 SAE |
| 49 | 4 | NT .500-13 HX G5 ZNYC |

TABLE 2

| INDEX NO. | QTY. | DESCRIPTION |
|---|---|---|
| 1 | 1 | PIVOT PIN |
| 2 | 2 | TURNBUCKLE ASSEMBLY |
| 3 | 6 | NT .312-18 HX G5 ZNYC |
| 4 | 12 | FW .343 × .687 × .051/.080 HD |
| 5 | 2 | .50 × 1.00 LOCK COLLAR |
| 6 | 4 | IGUS #MFI-0810-05 BUSHING |
| 7 | 2 | CS .312-18 × 1.25 HX G5 |
| 8 | 1 | RH LOWER STEER CRANK |
| 9 | 1 | LH LOWER STEER CRANK |
| 10 | 1 | CENTER IZT MOUNT PLATE |
| 11 | 5 | CS .312-18 × 1.00 HX G5 |
| 12 | 2 | PUMP ROD ASSEMBLY |
| 13 | 1 | RIGHT DAMPER MOUNT |
| 14 | 1 | BRAKE/TOW VALVE ROD |
| 15 | 1 | 1.31 RD .375-16 × .50 KNOB |
| 16 | 2 | NT .375-16 HXZY NL |
| 17 | 5 | FW .406 × .812 × .060 SAE |
| 18 | 1 | CS .375-16 × 2.25 HX G5 |
| 19 | 1 | BRAKE/TOW LINK |
| 20 | 1 | SPRING |
| 21 | 1 | BRAKE/TOW LINK PLATE |
| 22 | 5 | NT .375-16 HX GRD 5 ZNY |
| 23 | 1 | BRAKE/TOW VALVE PIVOT PLATE |
| 24 | 4 | FW .318 × .472 × .047 ZN |
| 25 | 2 | CP .093D × .750 LG HML Z |
| 26 | 2 | NT .312-18 HX JAM GR5 Z |
| 27 | 1 | ¼ COIL PL 1.23 SPRING |
| 28 | 1 | BRAKE ACTUATOR BRACKET |
| 29 | 1 | CHAIN (9 LINKS) |
| 30 | 2 | CS .312-18 × .875 HX G5 |
| 31 | 1 | NT .312-18 HXZY NL |
| 32 | 1 | ⅝ OD 4 IN SPRING |
| 33 | 1 | 1.15" SPLIT RING |

What is claimed is:

1. A lawnmower system comprising:
a. a mower frame that is movably supported for rolling over the ground by a pair of drive wheels; b. at least one pump and motor unit for driving the drive wheels; c. a handle bar assembly pivotally mounted to a control panel support positioned upwardly and rearwardly from said mower frame by at least one support member, said handle bar assembly operable for maneuvering and controlling the mower frame; d. a linkage mechanism connecting the handle bar assembly to the pump and motor unit, wherein rotating a portion of the handle bar assembly about a vertical axis increases a rotation of at least one drive wheel while decreasing the rotation of another drive wheel to steer the mower frame; and rotating a portion of the handle bar assembly about a horizontal axis increases or decreases the rotation of all drive wheels to control the forward or rearward speed of the mower frame; and e. a control assembly selectively engageable with said linkage mechanism to set a desired forward speed of the mower frame, said linkage mechanism further comprising a first upper crank and a second upper crank pivotally mounted on a bearing supported by said control panel support, each said crank having at least one arm; and a connecting rod operatively connecting said at least one arm of each said crank with a corresponding first lug and a second lug extending from said handle bar on opposite sides of said vertical axis.

2. The lawnmower system of claim 1, wherein said upper crank further comprises a second arm, and at least one linkage member operatively connects said second arm of said upper crank with a swash plate on said pump and motor unit.

3. The lawnmower system of claim 1, further comprising a first lower crank and a second lower crank interposed between said upper crank and said pump and motor unit, pivotally mounted to said frame forwardly of said upper crank.

4. The lawnmower system of claim 3, wherein said at least one linkage member operatively connects each said upper crank and a corresponding said lower crank.

5. The lawnmower system of claim 4, further comprising at least one pump rod operatively connecting each said lower crank to a corresponding pump and motor unit.

6. The lawnmower system of claim 1, wherein said control assembly comprises a control bar pivotally mounted to said control panel support, and a control cam pivotal with said control bar, wherein movement of said control bar engages said control cam with an arm of said upper crank.

7. The lawnmower system of claim 2, wherein said control cam is operable by said control assembly to prevent rotation of said upper crank.

8. The lawnmower system of claim 1, wherein the pump and motor unit is biased to rotate said drive wheels in a forward direction.

9. The lawnmower system of claim 1, further comprising: a damper assembly for returning the handle bar assembly to a centered, non-steering condition.

10. The lawnmower system of claim 2, wherein said damper assembly comprises a damper operatively connected between a damper arm that is rotatable with the handle bar assembly about said vertical axis, and said support member.

11. A lawnmower having a frame movably supported for rolling over the ground by a pair of drive wheels, a pump and motor unit for driving each drive wheel, a control panel support member positioned upwardly and rearwardly from said mower frame, a handle bar assembly pivotally mounted to the control panel support member, a linkage mechanism operatively connecting the handle bar assembly to each pump and motor unit, wherein rotating the handle bar assembly about a vertical axis increases rotation of one drive wheel while decreasing the rotation of the other drive wheel to steer the mower frame; and rotating the handle bar assembly about a horizontal axis increases or decreases the rotation of both drive wheels to control the forward or rearward speed of the mower frame; said handle bar assembly comprising a control bar pivotally mounted to said control panel support member and a control cam pivotal with said control bar, wherein movement of said control bar engages said control cam with said linkage mechanism to set a desired forward speed of the mower frame, said linkage mechanism further comprising an upper crank having at least one arm, said crank pivotally mounted to said control panel support member, and a connecting rod operatively connected between said arm and a lug extending from a said handle bar.

12. The lawnmower of claim 11, wherein said linkage mechanism further comprises a linkage member operatively connected between a second arm of said upper crank and a swash plate on said pump and motor unit.

13. The lawnmower of claim 11, further comprising a lower crank interposed between said upper crank and said pump and motor unit, said lower crank pivotally mounted to said mower frame forwardly of said upper crank.

14. The lawnmower of claim 13, wherein a linkage member operatively connects said upper crank and said lower crank.

15. The lawnmower of claim 14, wherein a pump rod operatively connects said lower crank to a swash plate on said pump and motor unit.

16. The lawnmower of claim 11, wherein movement of said control bar engages said control cam with an arm of said upper crank.

17. The lawnmower of claim 16, wherein said control cam is operable to prevent rotation of said upper crank.

18. The lawnmower of claim 11, wherein the pump and motor unit is biased to rotate said drive wheels in a forward direction.

19. The lawnmower of claim 11, further comprising: a damper assembly for returning the handle bar assembly to a centered, non-steering condition, said damper assembly comprising a damper operatively connected between said control panel frame and a damper arm that is rotatable with the handle bar assembly about said vertical axis.

* * * * *